(12) United States Patent
Lee et al.

(10) Patent No.: US 12,552,150 B2
(45) Date of Patent: Feb. 17, 2026

(54) PLASMA GENERATION DEVICE AND FACILITY FOR MANUFACTURING ELECTRODE ASSEMBLY INCLUDING THE SAME

(71) Applicant: LG Energy Solution, Ltd., Seoul (KR)

(72) Inventors: Sang Kyun Lee, Daejeon (KR); Kyoung Won Kang, Daejeon (KR); Yong Tae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 302 days.

(21) Appl. No.: 18/022,036

(22) PCT Filed: Mar. 14, 2022

(86) PCT No.: PCT/KR2022/003551
§ 371 (c)(1),
(2) Date: Oct. 2, 2023

(87) PCT Pub. No.: WO2022/197048
PCT Pub. Date: Sep. 22, 2022

(65) Prior Publication Data
US 2024/0367428 A1    Nov. 7, 2024

(30) Foreign Application Priority Data

Mar. 15, 2021  (KR) ......................... 10-2021-0033649
Mar. 14, 2022  (KR) ......................... 10-2022-0031450

(51) Int. Cl.
*B32B 41/00*  (2006.01)
*B32B 38/00*  (2006.01)
(Continued)

(52) U.S. Cl.
CPC ..... *B32B 38/0008* (2013.01); *H01M 10/0404* (2013.01); *H01M 10/0459* (2013.01);
(Continued)

(58) Field of Classification Search
CPC .......... B32B 38/0008; B32B 2457/10; H01M 10/0404; H01M 10/0459; H01M 10/04;
(Continued)

(56) References Cited

U.S. PATENT DOCUMENTS

2011/0269012 A1  11/2011  Perner et al.
2018/0130985 A1   5/2018  Kim et al.
(Continued)

FOREIGN PATENT DOCUMENTS

CN   108933273 A    12/2018
JP   2005201762 A    7/2005
(Continued)

OTHER PUBLICATIONS

International Search Report for PCT/KR2022/003551 mailed Jun. 27, 2022. 3 pgs.
(Continued)

*Primary Examiner* — Michael N Orlando
*Assistant Examiner* — Joshel Rivera
(74) *Attorney, Agent, or Firm* — Lerner David LLP

(57) ABSTRACT

A plasma generation device forms a patterned adhesive layer on a separation sheet surface and includes a roller part and plasma generator. The roller part includes a transfer roller for transferring the separation sheet and a metal member embedded in the transfer roller. The plasma generator includes a main body, electrode members, and a guide member. The main body is configured to be spaced from the transfer roller and elongated in a width direction perpendicular to a transfer direction of the separation sheet. The electrode members are disposed in the width direction and generate plasma on only a separation sheet surface disposed facing the metal member to form the patterned adhesive layer. The guide member fixes the electrode members to the main body and is detachably coupled to the main body to fix (Continued)

the electrode members to or separate the electrode members from the main body at the same time.

13 Claims, 15 Drawing Sheets

(51) Int. Cl.
 *H01M 10/04* (2006.01)
 *H05H 1/24* (2006.01)
(52) U.S. Cl.
 CPC ............ *H05H 1/47* (2021.05); *B32B 2457/10* (2013.01); *H05H 2245/40* (2021.05)
(58) Field of Classification Search
 CPC ...... H01M 50/403; H01M 50/46; H05H 1/47; H05H 2245/40; H05H 1/2406; H05H 1/2418; H05H 1/24; H05H 1/48; Y02E 60/10; Y02P 70/50
 USPC .................... 156/60, 64, 350, 351, 378, 379
 See application file for complete search history.

(56) References Cited

U.S. PATENT DOCUMENTS

| | | | |
|---|---|---|---|
| 2018/0323415 A1 | 11/2018 | Lee et al. | |
| 2019/0027777 A1 | 1/2019 | Lee et al. | |
| 2019/0044177 A1 | 2/2019 | Lee et al. | |
| 2019/0207243 A1 | 7/2019 | Lee et al. | |
| 2019/0215944 A1 | 7/2019 | Lee et al. | |
| 2020/0185680 A1* | 6/2020 | Kim | H05H 1/473 |

FOREIGN PATENT DOCUMENTS

| | | | |
|---|---|---|---|
| JP | 2010514112 A | 4/2010 | |
| JP | 2014032935 A | 2/2014 | |
| JP | 2015128861 A | 7/2015 | |
| JP | 2020136130 A | 8/2020 | |
| KR | 20110015997 A | 2/2011 | |
| KR | 20120111078 A | 10/2012 | |
| KR | 20150028537 A | 3/2015 | |
| KR | 20160028730 A | 3/2016 | |
| KR | 101625602 B1 | 5/2016 | |
| KR | 20160086025 A | 7/2016 | |
| KR | 20170096517 A | 8/2017 | |
| KR | 20180006324 A | 1/2018 | |
| KR | 20180032763 A | 4/2018 | |
| KR | 20180039561 A | 4/2018 | |
| KR | 20180051072 A | 5/2018 | |
| KR | 20180086364 A | 7/2018 | |
| KR | 20180097348 A | 8/2018 | |
| KR | 20180128757 A | 12/2018 | |
| KR | 20190000589 A | 1/2019 | |

OTHER PUBLICATIONS

Search Report dated Jan. 6, 2026 from the Office Action for Chinese Application No. 202280006481.X issued Jan. 7, 2026 , pp. 1-2.

* cited by examiner

PLASMA GENERATION DEVICE AND FACILITY FOR MANUFACTURING ELECTRODE ASSEMBLY INCLUDING THE SAME

CROSS-REFERENCE TO RELATED APPLICATIONS

The present application is a national phase entry under 35 U.S.C. § 371 of International Application No. PCT/KR2022/003551, filed on Mar. 14, 2022, which claims priority from Korean Patent Application Nos. 10-2021-0033649, filed on Mar. 15, 2021, and 10-2022-0031450, filed on Mar. 14, 2022, which are hereby incorporated herein by reference in their entireties.

FIELD

The present invention relates to a plasma generation device and a facility for manufacturing an electrode assembly including the same, and more particularly, to a plasma generation device, which is capable of improving adhesion, impregnation properties, and discharge properties at the same time, and a facility for manufacturing an electrode assembly including the same.

BACKGROUND

In general, secondary batteries refer to chargeable and dischargeable batteries, unlike primary batteries that is impossible to charge. Such secondary batteries are widely used in high-tech electronic devices such as phones, notebook computers, and camcorders.

The secondary batteries are classified into a can type secondary battery, in which an electrode assembly is embedded in a metal can, and a pouch type secondary battery in which an electrode assembly is embedded in a pouch. A can type secondary battery includes an electrode assembly, a can accommodating the electrode assembly, and a cap assembly mounted in an opening of the can. Also, a pouch type secondary battery includes an electrode assembly and a pouch accommodating the electrode assembly.

On the other hand, the electrode assembly is divided into a jelly-roll type (wound type) electrode assembly, a stack type electrode assembly, and a stack/folding type electrode assembly. Here, the stack/folding type electrode assembly includes a separation sheet and a plurality of radical units stacked through the separation sheet. Each of the radical units has a structure in which a first electrode and a second electrode are alternately stacked with a separator therebetween. Here, the first electrode is a positive electrode, and the second electrode is a negative electrode, and vice versa.

A method for manufacturing the electrode assembly includes a process of supplying a separation sheet, a process of forming an adhesive layer on an entire surface of the separation sheet, a process of disposing a radical unit on the separation sheet, on which the adhesive layer is formed, to adhere to each other, and a process of folding the separation sheet to stack the radical unit.

However, in the method for manufacturing the electrode assembly according to the related art, the adhesive layer may be formed on the entire surface of the separation sheet to significantly improve adhesion between the separation sheet and the radical unit, but there is a problem in that an electrolyte impregnation property and a gas discharge property between the separation sheet and the radical unit are significantly deteriorated.

SUMMARY OF THE DISCLOSURE

To solve the above problems, an object of the present invention is to provide a plasma generation device, in which a patterned adhesive layer is formed on a separation sheet so that the separation sheet and a radical unit pattern-adhere to each other when an electrode assembly is manufactured, thereby improving adhesion between the separation sheet and the radical unit, an electrolyte impregnation property, and a gas discharge property at the same time, and a facility for manufacturing an electrode assembly including the same.

A plasma generation device, which forms a patterned adhesive layer on a surface of a separation sheet, according to an embodiment, includes: a roller part including a transfer roller configured to transfer the separation sheet and a metal member embedded in the transfer roller; and a plasma generator including a main body disposed to be spaced apart from the transfer roller and provided to be elongated in a width direction of the separation sheet, which is perpendicular to a transfer direction of the separation sheet, a plurality of electrode members disposed in the width direction of the separation sheet and configured to generate plasma on only a surface of the separation sheet, which is disposed at a position facing the metal member, to form the patterned adhesive layer on the surface of the separation sheet, and a guide member configured to fix the plurality of electrode members to the main body, wherein the guide member is detachably coupled to the main body to fix or separate the plurality of electrode members to/from the main body at the same time.

The plurality of electrode members may be slidably movably coupled to the guide member in the width direction of the separation sheet.

A guide groove to which the plurality of electrode members are slidably movably coupled in the width direction of the separation sheet may be formed in an outer surface of the guide member.

Each of the electrode member may include: a coupling part slidably coupled to the guide groove of the guide member; an electrode part configured to generate the plasma on only a surface of the separation sheet disposed at the position facing the metal member; and a connection part configured to connect the coupling part to the electrode part.

The connection part may be detachably coupled to the coupling part.

The guide groove may include: a first groove provided in an outer surface of the guide member; and a second groove provided inside the guide member and connected to the first groove, wherein the second groove has a diameter greater than that of the first groove, wherein the coupling part may include: a support piece which is supported by the guide member and to which the connection part is connected; a coupling bolt inserted up to the second groove via the first groove by passing through the support piece; and a coupling nut inserted into the second groove and coupled to the coupling bolt.

The second groove may be formed to pass in a lateral direction of the guide member, which correspond to the width direction of the separation sheet, so that the coupling nut is inserted.

The main body may further include a support part configured to support the electrode part, wherein the support part may be formed to be elongated in the width direction of the separation sheet and be formed to have a curved surface corresponding to the transfer roller.

A display member on which a scale is displayed in the width direction of the separation sheet may be provided on a surface of the guide member, and the support piece may be adjusted in position according to the scale of the display member.

The plurality of electrode members may include: a first electrode member disposed on each of both ends of the main body in the width direction of the separation sheet; and a second electrode member provided between the first electrode members, wherein the first electrode member and the second electrode member may have lengths different from each other when viewed in the width direction of the separation sheet.

The first electrode member may have a length greater than that of the second electrode member.

The main body may be made of a non-metal material, and the electrode part may be provided as a corona discharge electrode.

The connection part may be provided in two or more and has a cross-section having a circular rod shape.

A facility for manufacturing an electrode assembly according to an embodiment includes: a supply device configured to supply a separation sheet; a plasma generation device configured to form a patterned adhesive layer on a surface of the separation sheet supplied by the supply device and prepared by claim 1; a disposition device disposing a radical unit on the surface of the separation sheet, on which the adhesive layer is formed, so that the separation sheet and the radical unit pattern-adhere to each other; a lamination device configured to press the separation sheet and the radical unit to be bonded to each other; and a folding device configured to fold the separation sheet, on which the radical unit is disposed, to stack the radical unit vertically.

The plasma generation device according to an embodiment may include the roller part and the plasma generator to form the patterned adhesive layer on the surface of the separator sheet, and thus, the separation sheet and the radical unit may pattern-adhere to each other to improve the adhesion, the electrolyte impregnation property, and the gas discharge property at the same time. That is, the separation sheet and the radical unit may be improved in adhesion through the adhesion portion between the separation sheet and the radical unit, and the electrolyte impregnation property and the gas discharge property may be improved through the non-adhesion portion between the separation sheet and the radical unit.

DETAILED DESCRIPTION

Figure 1:
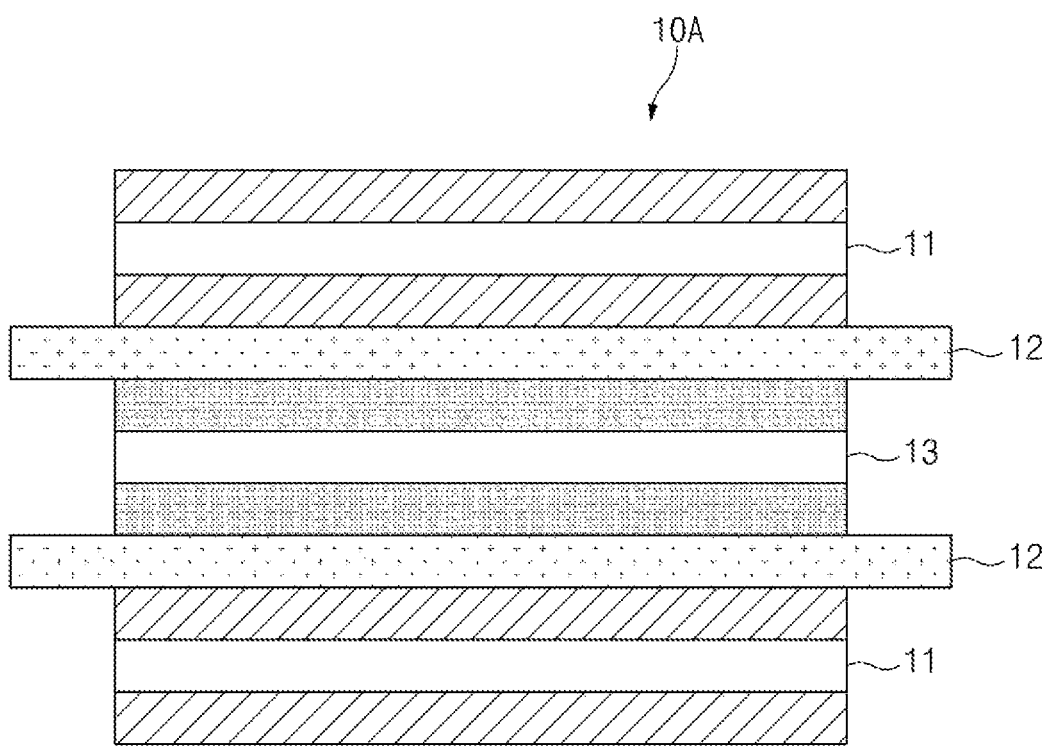
FIG. 1 is a cross-sectional view illustrating a C-type bicell of a radical unit according to a first embodiment.
Figure 2:
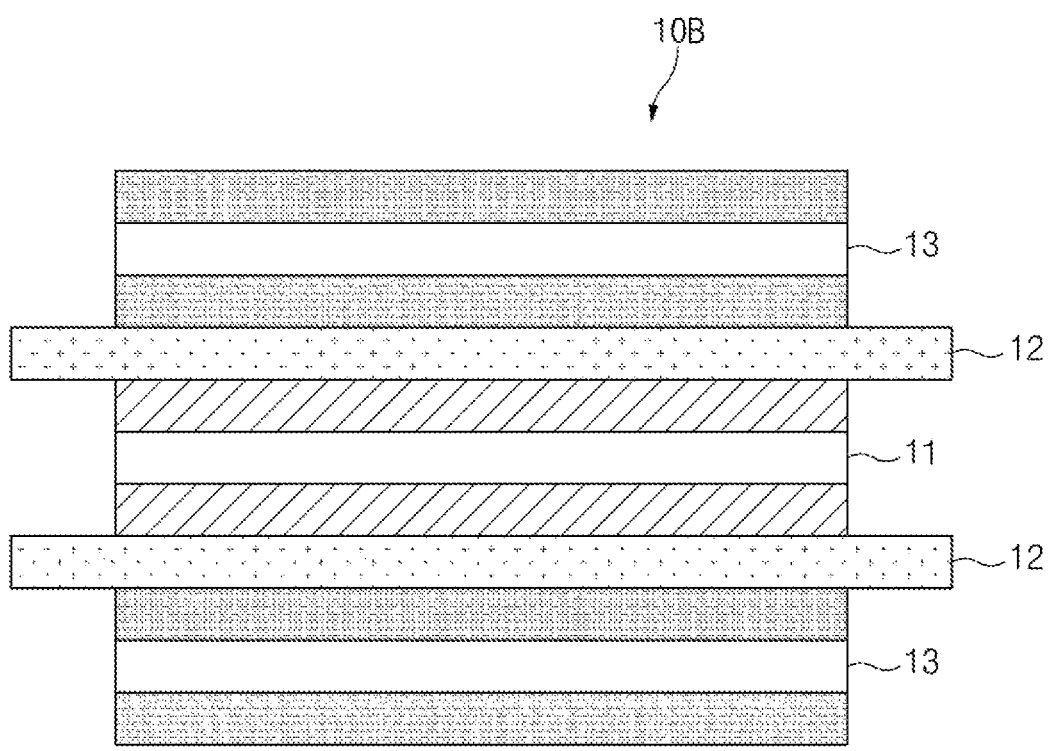
FIG. 2 is a cross-sectional view illustrating an A-type bicell of the radical unit according to the first embodiment.
Figure 3:
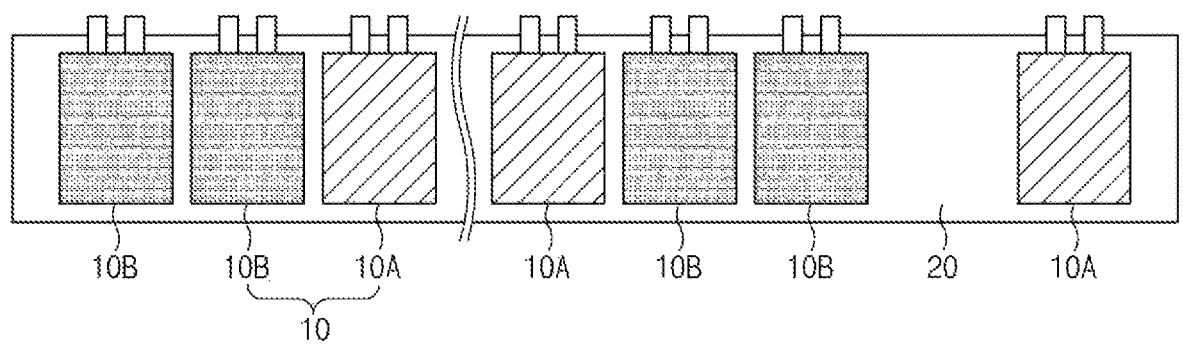
FIG. 3 is a plan view illustrating a state before an electrode assembly is folded according to the first embodiment.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly According to the First Embodiment]

As illustrated in FIGS. 1 to 4, an electrode assembly 1 according to the first embodiment includes a radical unit 10, and the radical unit 10 includes a C-type bicell 10A and an A-type bicell 10B. The C-type bicell 10A has a structure in which a positive electrode 11, a separator 12, a negative electrode 13, a separator 12, and a positive electrode 11 are sequentially stacked. The A-type bicell 10B has a structure in which a negative electrode 13, a separator 12, a positive electrode 11, a separator 12, and a negative electrode 13 are sequentially stacked.

Figure 4:
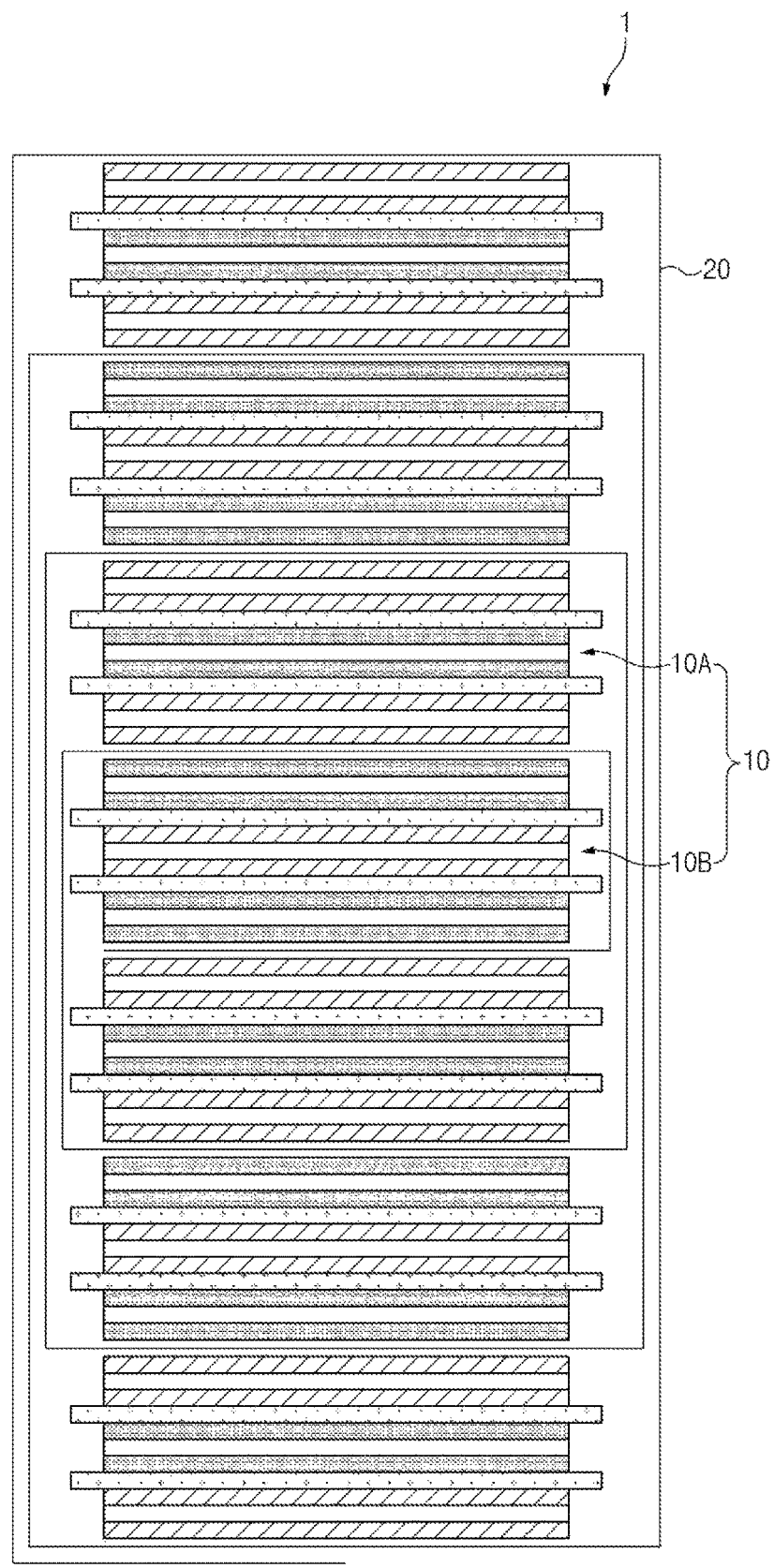
FIG. 4 is a cross-sectional view illustrating a state after the electrode assembly is folded according to the first embodiment.
Figure 5:
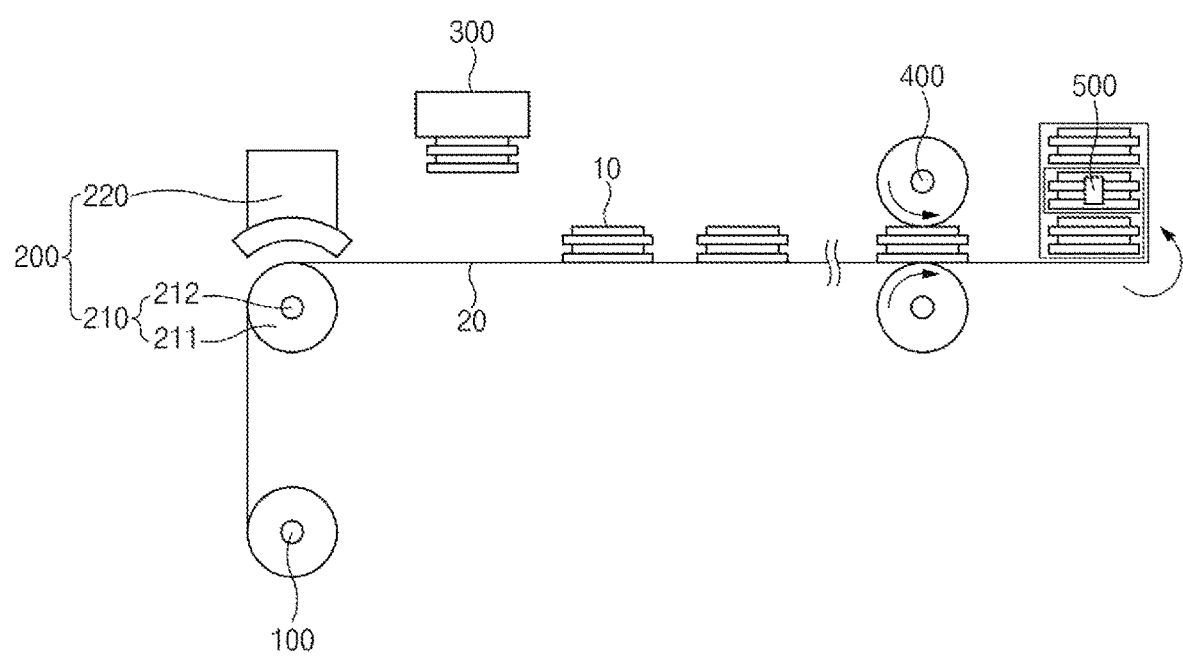
FIG. 5 is a schematic side view illustrating a facility for manufacturing the electrode assembly according to the first embodiment.

In the radical unit 10 having the stacked structure, the C-type bicell 10A and the A-type bicell 10B may be stacked to face each other with a separation sheet 20 therebetween, thereby manufacturing an electrode assembly 1 as illustrated in FIG. 4.

The electrode assembly 1 as described above is manufactured through a facility for manufacturing an electrode assembly.

[Facility for Manufacturing Electrode Assembly According to the First Embodiment]

As illustrated in FIGS. 5 to 13, a facility for manufacturing an electrode assembly according to the first embodiment includes a supply device 100 supplying a separation sheet 20, a plasma generation device 200 forming an adhesive layer on a surface of the separation sheet 20 supplied by the supply device 100, a disposition device 300 disposing a radical unit 10 on the surface of the separation sheet 20, on which an adhesive layer is formed, so that the separation sheet 20 and the radical unit 10 adhere to each other, a lamination device 400 pressing the separation sheet 20 and the radical unit 10 to be bonded to each other, and a folding device 500 folding the separation sheet 20, on which the radical unit 10 is disposed, to manufacture an electrode assembly 1, in which the radical unit 10 is vertically stacked.

Supply Device

The supply device 100 is configured to supply the separation sheet. That is, the supply device 100 has a roller structure, and when the supply device 100 rotates, the wound separation sheet 20 is unwound to be supplied up to the folding device 500 via the plasma generation device 200, the disposition device 300, and the lamination device 400.

Plasma Generation Device

The plasma generation device 200 is configured to form the adhesive layer on the surface of the separation sheet. That is, the plasma generation device 200 generates plasma on the surface (a top surface of the separation sheet when viewed in FIG. 5) of the separation sheet 20 supplied by the supply device to form the adhesive layer on the surface of the separation sheet 20.

Disposition Device

The disposition device 300 is configured to dispose the radical unit on the surface of the separation sheet. That is, the disposition device 300 holds the radical unit 10 stored at a set place and then disposes the radical unit 10 on the surface of the separation sheet on which the adhesive layer is formed. Then, the radical unit 10 adheres to the separation sheet 20 by the adhesive layer.

Lamination Device

The lamination device 400 is configured to bond the radical unit to the separation sheet. That is, the lamination device 400 is provided as a pair of rolling rollers and presses the radical unit 10 and the separation sheet 20, which pass through the disposition device 300, to bond the radical unit 10 to the separation sheet 20.

Folding Device

The folding device 500 is configured to manufacture the electrode assembly. That is, the folding device 500 folds the separation sheet 20, on which the radical unit 10 is disposed, to stack the radical unit 10 in the vertical direction. Then, as illustrated in FIG. 4, the electrode assembly 1 may be manufactured.

In the facility for manufacturing the electrode assembly according to the first embodiment, the plasma generation device 200 may be improved to improve the adhesion between the radical unit 10 and the separation sheet 20, the electrolyte impregnation property, and the gas discharge property, thereby manufacturing a high-quality electrode assembly.

That is, in the facility for manufacturing the electrode assembly according to the first embodiment of the present invention, the patterned adhesive layer may be formed on the surface of the separation sheet through the plasma generation device 200 so that the radical unit and the separation sheet pattern-adhere to each other. As a result, the adhesion may be improved through an adhesion surface between the radical unit and the separation sheet, and the electrolyte impregnation property and the gas discharge property may be improved through the non-adhesion surface between the radical unit and the separation sheet.

For example, the plasma generation device 200 is configured to form the patterned adhesive layer on the surface of the separation sheet 20 supplied through the supply device 100 and includes a roller part 210 and a plasma generator 220.

The roller part 210 supports a bottom surface of the separation sheet 20 supplied through the supply device 100 and includes a transfer roller 211 transferring the separation sheet 20 during rotation and a metal member 212 embedded in the transfer roller 211.

The plasma generator 220 includes a main body 221 formed to be spaced apart from the transfer roller 211, a plurality of electrode members 222 generating plasma on only the surface of the separation sheet 20 disposed to face the metal member 212 to form the patterned adhesive layer 21 on the surface of the separation sheet 20, and a guide member 223 fixing the plurality of electrode members 222 to the main body 221.

The main body 221 is disposed on the separation sheet 20 supported by the transfer roller 211 and formed to be elongated along a width direction of the separation sheet 20, which is perpendicular to a transfer direction of the separation sheet 20. That is, the main body 221 and the transfer roller 211 have directions and lengths corresponding to each other. Here, the main body 221 may be made of a non-metal material.

Each of the electrode member 222 is disposed on an outer surface of the main body 221 corresponding to the transfer direction of the separation sheet and has a structure, in which the plurality of electrode members 222 are arranged at a set interval in a longitudinal direction of the main body 221, which correspond to the width direction of the separation sheet.

Figure 13:
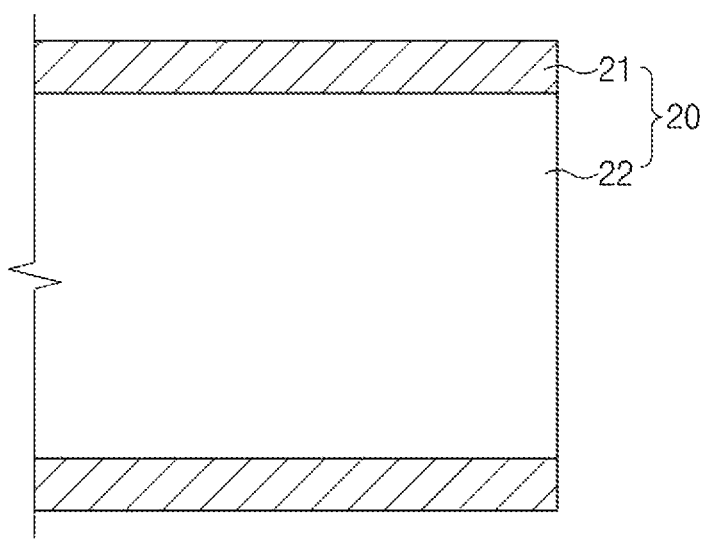
FIG. 13 is a plan view illustrating a separation sheet on which a patterned adhesive layer is formed according to the first embodiment.

That is, referring to FIG. 13, plasma is generated on only the surface of the separation sheet disposed between the plurality of electrode members 222 and the metal member 212, and thus, the adhesive layer 21 may be formed on only the surface of the separation sheet 20 disposed between the electrode members 222 and the metal member 212. Of course, since the plasma is not generated on the surface of the separation sheet 20, on which the electrode member is not disposed, a non-adhesion layer 22 is formed. Thus, the patterned adhesive layer 21 is formed on the surface of the separation sheet 20. As a result, the separation sheet 20 has a pattern in which the adhesive layer 21 and the non-adhesive layer 22 are alternately formed in the width direction. In other words, the patterned adhesive layer 21 is formed on the surface of the separation sheet 20.

The electrode member 222 may be a corona discharge electrode. The plasma may be stably generated between the metal member 252 and the main body 253a through the corona discharge electrode.

Figure 6:
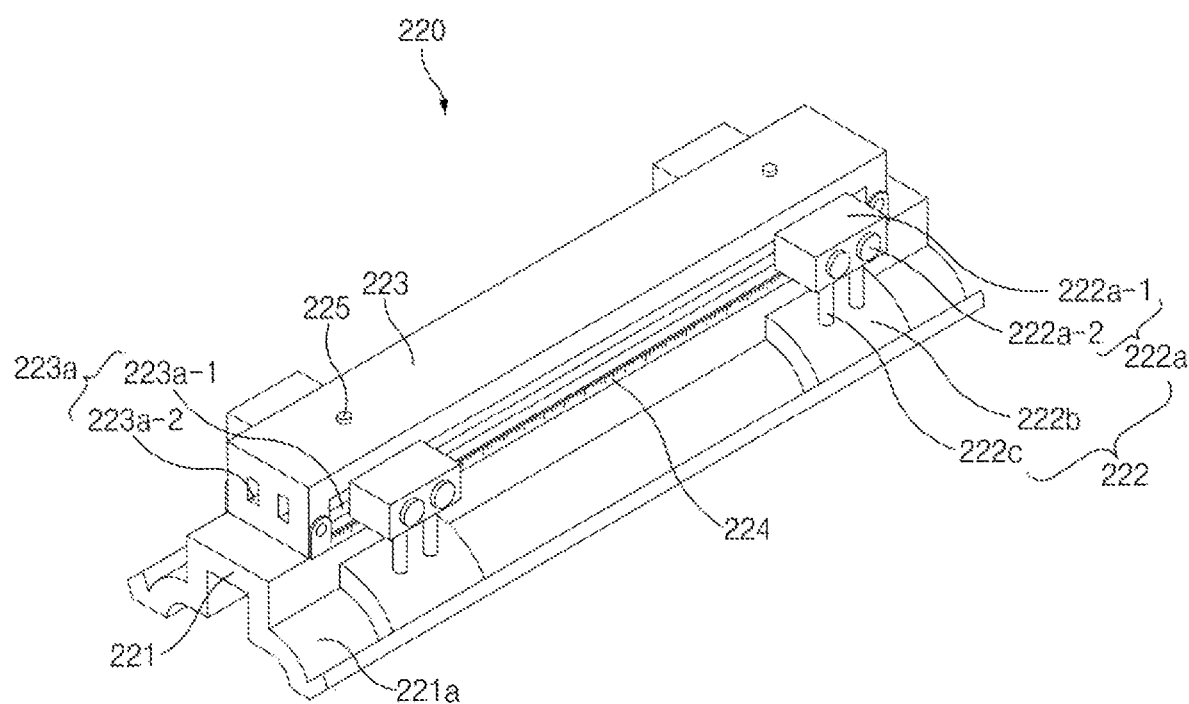
FIG. 6 is a perspective view illustrating a plasma generator of a plasma generation device according to the first embodiment.
Figure 7:
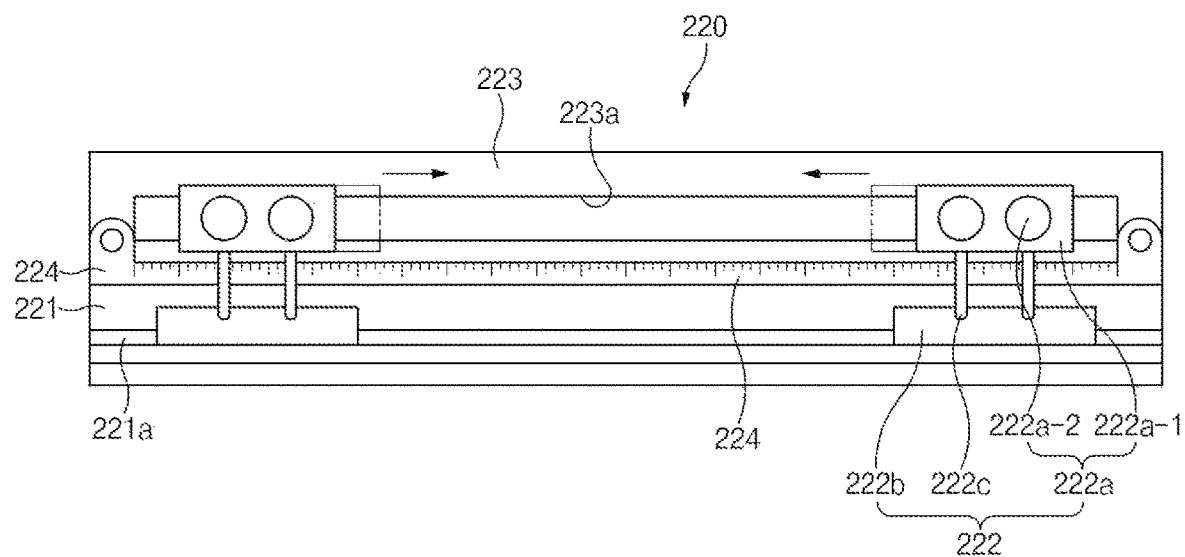
FIG. 7 is a front view of the plasma generator of FIG. 6.
Figure 8:
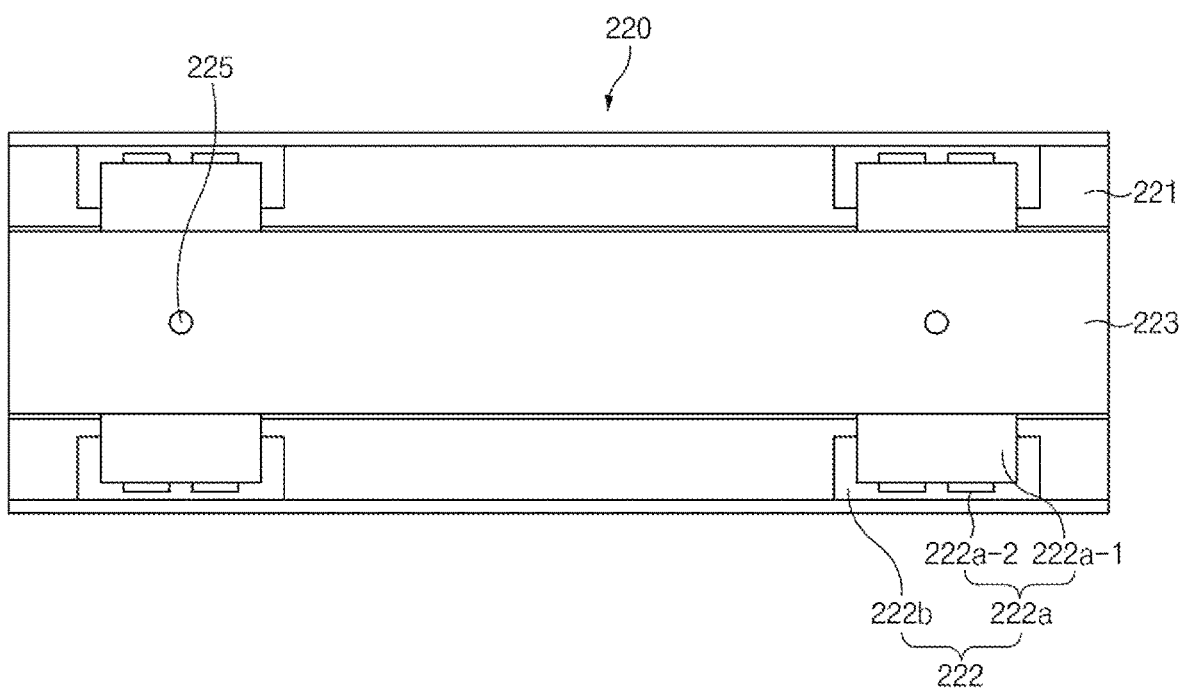
FIG. 8 is a plan view of the plasma generator of FIG. 6.
Figure 9:
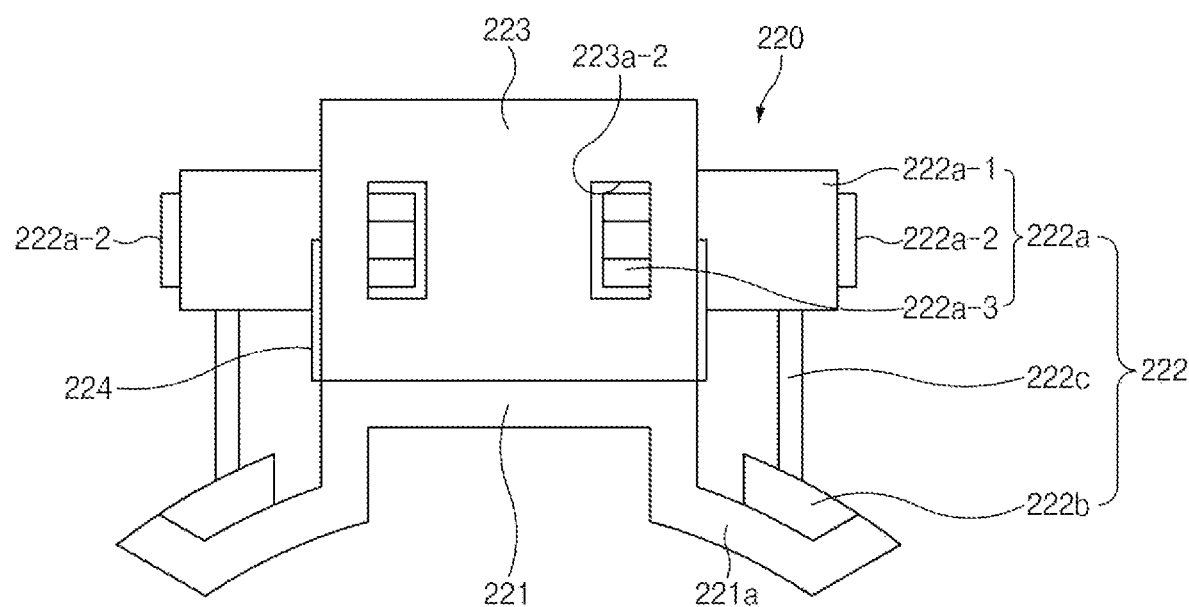
FIG. 9 is a side view of the plasma generator of FIG. 6.
Figure 10:
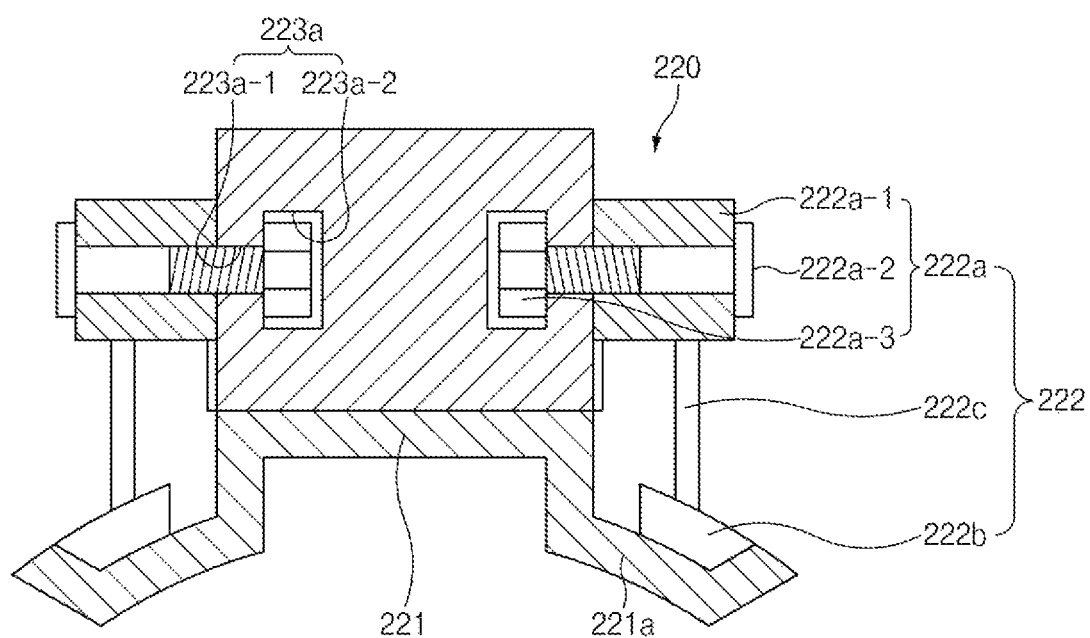
FIG. 10 is a side cross-sectional view of the plasma generator of FIG. 6.
Figure 11:
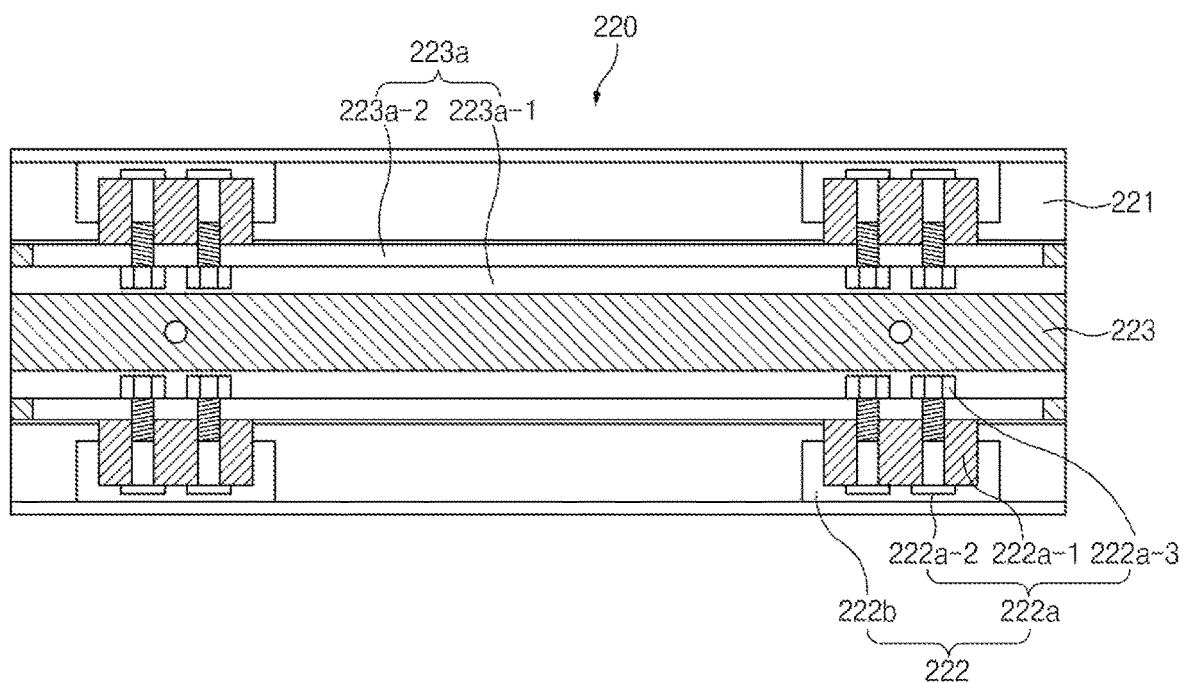
FIG. 11 is a plan cross-sectional view of the plasma generator of FIG. 6.
Figure 12:
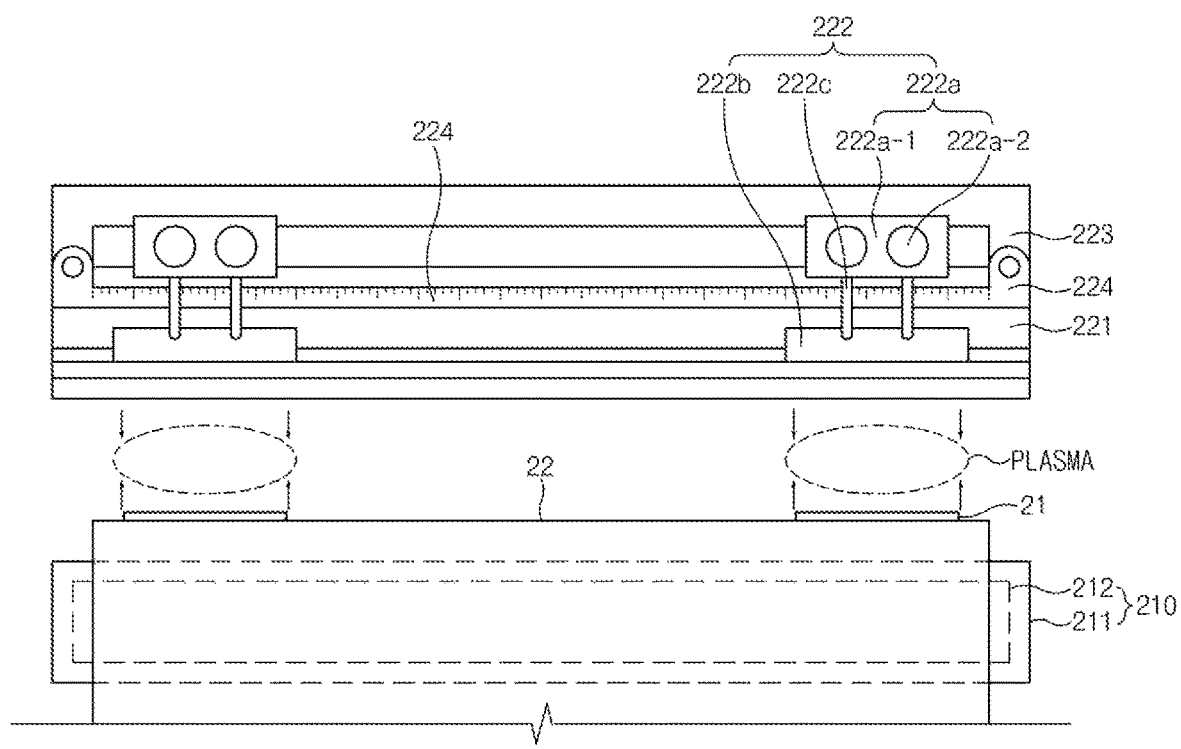
FIG. 12 is a side view illustrating a usage state of the plasma generation device according to the first embodiment.

The guide member 223 is configured to fix the plurality of electrode members to the main body and is provided on a top surface of the main body 221 when viewed in FIG. 6. A guide groove 223a formed to be elongated in the width direction of the separation sheet 20 is formed in each of both surfaces (left and right surfaces when viewed in FIG. 6) corresponding to the transfer direction of the separation sheet 20. The plurality of electrode members 222 may be installed in the guide grooves 223a to fix the plurality of electrode members 222 to the main body 221.

Particularly, the guide member 223 may be detachably coupled to the main body 221 to fix or separate the plurality of electrode members to/from the main body 221 at the same time. For example, the guide member 223 may be detachably coupled to the main body 221 through a fixing member 225. That is, the fixing member 225 is provided as a fixing bolt, and the fixing bolt passes through the guide member and is coupled to the main body 221. Thus, when the fixing bolt is tightened, the guide member 223 and the main body 221 may be coupled without being separated from each other, and when the fixing bolt is loosened, the guide member 223 may be separated from the main body. Thus, when the guide member is separated from the main body, the plurality of electrode members may be simultaneously separated from the main body, and when the guide member is coupled to the main body, the plurality of electrode members may be simultaneously fixed to the main body. As a result, it is possible to improve efficiency of maintenance and operation.

Here, the guide groove 223*a* is formed to be elongated along the width direction of the separation sheet 20, and thus, each of the plurality of electrode members 222 is slidably movably coupled to the guide groove 223*a* of the guide member 223 in the width direction of the separation sheet 20. As a result, a position of each of the plurality of electrode members 222 in the width direction of the separation sheet 20 may be adjusted, and a position of the adhesive layer formed on the separation sheet may be adjusted.

The plasma generation device 200 having the above-described structure generates plasma between the separation sheet 20 and the main body 221 due to a mutual reaction of the metal member provided in the roller part 210 installed on the guide member 223 of the plasma generator 220 to transfer the plurality of electrode members 222 and the separation sheet 20. Here, the plasma may be generated on only the surface of the separation sheet 20 disposed between the electrode member 222 and the metal member 212 to form the patterned adhesive layer 21 on the surface of the separation sheet 20.

Here, the plurality of electrode members 222 may slidably move along the guide groove 223*a* of the guide member 223 in the width direction of the separation sheet 20, and as a result, the adhesive layer 21 to be formed on the separation sheet 20 may be adjusted in position.

In the separation sheet 20 on which the adhesive layer is formed as described above, the radical unit 10 is disposed on the surface of the separation sheet 20 while passing through the disposition device 300. Here, the radical unit 10 pattern-adheres to the radical unit 10 and the separation sheet 20 while adhering to the patterned adhesive layer 21. That is, the adhesion may be improved through the adhesion surface between the radical unit 10 and the separation sheet 20, and the electrolyte impregnation property and the gas discharge property may be improved through the non-adhesion surface between the radical unit 10 and the separation sheet 20.

Therefore, in the facility for manufacturing the electrode assembly according to the first embodiment, the plasma generation device 200 may be improved to manufacture the electrode assembly having the improved electrolyte impregnation property and gas discharge property.

In the plasma generation device 200, the electrode member 222 has a structure with ease of manufacture and installation. That is, the electrode member 222 includes a coupling part 222*a* slidably coupled to the guide groove 223*a* of the guide member 223, an electrode part 222*b* generating plasma while corresponding to the metal member 212 to form the patterned adhesive layer 21 on the surface of the separation sheet 20, and a connection part 222*c* connecting the coupling part 222*a* to the electrode part 222*b*. In the electrode member 222 having the above-described structure, only a portion corresponding to the metal member 212 may be formed as the electrode part 222*c* to significantly reduce costs, and a portion coupled to the guide member 223 may be formed as the coupling part 222*a* having strength to improve a coupling property with the guide member 223. In addition, the connection part 222*c* connecting the coupling part 222*a* to the electrode part 222*b* may be minimized in size and diameter to minimize a weight and costs.

Particularly, the connection part 222*c* may be detachably coupled to the electrode part 222*b* or the coupling part. That is, the connection part 222*c* may be inserted into the coupling groove formed in the electrode part 222*b* or the groove formed in the coupling part so as to be coupled. Thus, when the electrode part 222*b* is damaged, since only the connection part 222*c* coupled to the coupling part or the electrode part 222*b* coupled to the connection part needs to be separated, costs for the maintenance may be reduced.

The guide member 223 and the electrode member 222 may have a coupling structure that is capable of being easily fixed and released. That is, the guide groove 223*a* includes a first groove 223*a*-1 provided outside (left and right surfaces of the guide member when viewed in FIG. 6) the guide member 223 and a second groove 223*a*-2 provided inside the guide member 223, connected to the first groove 223*a*-1, and having a diameter greater than that of the first groove 223*a*-1 in the vertical direction when viewed in FIG. 6. Also, the coupling part 222*a* includes a support piece 222*a*-1 which is supported by the guide member 223 and to which the connection part 222*c* is connected, a coupling bolt 222*a*-2 inserted up to the second groove 223*a*-2 via the first groove 223*a*-1 by passing through the support piece 222*a*-1, and a coupling nut 222*a*-3 coupled to the coupling bolt 222*a*-2 disposed in the second groove 223*a*-2.

Thus, in the coupling part 222*a*, when the coupling bolt 222*a*-2 and the coupling nut 222*a*-3 are coupled to each other, the support piece 222*a*-1 may be pressed to the guide member 223 and thus fixed to the guide member 223 without movement, and as a result, the position of the electrode part may be fixed. Also, when the coupling of the coupling bolt 222*a*-2 and the coupling nut 222*a*-3 is partially released or completely released, the fixing of the support piece 222*a*-1 fixed to the guide member 223 may be released to allow the support piece 222*a*-1 to move in the width direction of the separation sheet within the first groove 223*a*-1, and as a result, the electrode part may move in the width of the separation sheet. Thereafter, when the coupling bolt 222*a*-2 and the coupling nut 222*a*-3 are coupled, the support piece 222*a*-1 may be pressed to the guide member 223 to fix the position of the electrode part.

The second groove 223*a*-2 is formed to pass in a lateral direction (a longitudinal direction of the guide member when viewed in FIG. 6) of the guide member 223 corresponding to the width direction of the separation sheet 20 so that the coupling nut 222*a*-3 is inserted therein. Thus, the coupling nut 222*a*-3 may be easily inserted into the second groove 223*a*-2.

The main body 221 may further include a support part 221*a* supporting the electrode part 222*b*. The support part 221*a* may support the surface of the electrode part 222*b* facing the transfer roller 211, and thus, the support part 221*a* may increase in fixing force. Particularly, the support part 221*a* is formed to be elongated in the width direction of the separation sheet and is formed to have a curved surface corresponding to the transfer roller 211. Thus, the support part 221*a* formed to have the curved surface corresponding to the transfer roller may be stably supported, and in particular, the support part 221*a* may stably move in the width direction of the separation sheet.

A display member 224 on which a scale is displayed in the width direction of the separation sheet 20 may be provided on a surface (a front surface when viewed in FIG. 6) of the guide member 223 on which the support piece 222*a*-1 is supported. Thus, a moving distance of the support piece 222*a*-1 may be accurately calculated. Particularly, the scale is formed symmetrically in left and right directions with respect to a center line that equally divides the display member 224, and thus, the electrode member may be symmetrically positioned at the left and right sides of the guide member with respect to the center line that equally divides the width of the guide member.

Hereinafter, in description of other embodiments of the present invention, the same constituent symbols are used for constituent symbols having the same configuration as the above-described embodiments, and redundant descriptions will be omitted.

[Plasma Generation Device According to the Second Embodiment]

Figure 14:
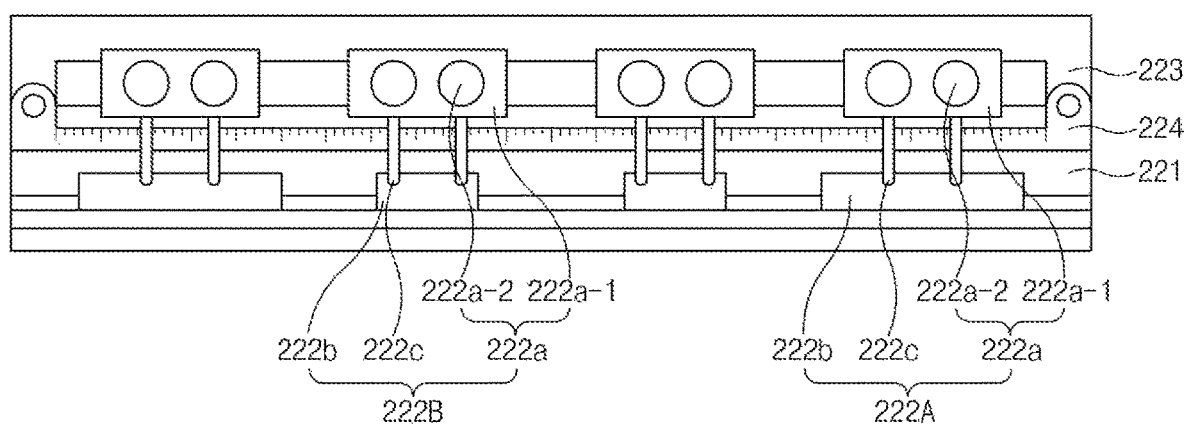
FIG. 14 is a side view illustrating a plasma generation device according to a second embodiment.
Figure 15:
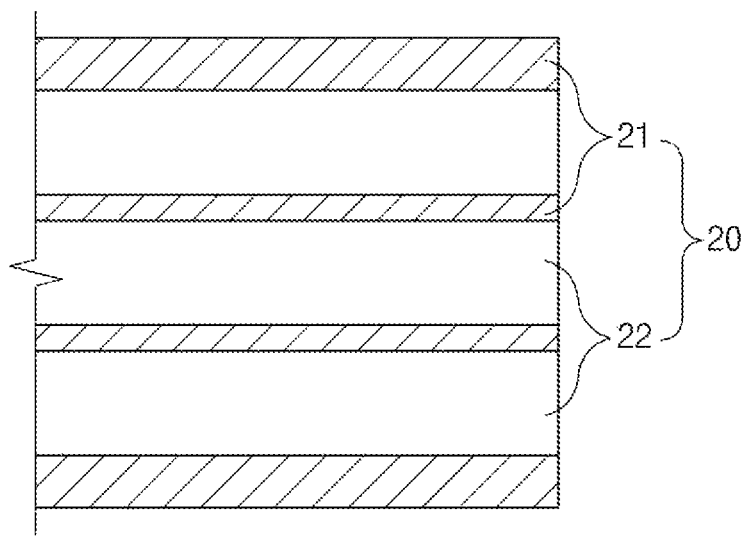
FIG. 15 is a plan view illustrating a separation sheet on which a pattern adhesive layer is formed according to the second embodiment.

As illustrated in FIGS. 14 and 15, a plasma generation device 200 according to the second embodiment includes a plurality of electrode members 222, and each of the electrode members 222 includes a coupling part, an electrode part, and a connection part.

The plurality of electrode members 222 may be provided in two types having different lengths when viewed in a width direction of a separation sheet 20.

For example, the plurality of electrode members 222 include a first electrode member 222A disposed at each of both ends of a main body 221 in the width direction of the separation sheet 20 and a second electrode member 222B provided between the first electrode members 222A. The first electrode member 222A has a length greater than that of the second electrode member 222B in the width direction of the separation sheet 20. Thus, in the plasma generation device 200 according to the second embodiment, as illustrated in FIG. 15, adhesive layers having different widths may be formed on a surface of the separation sheet.

In the plasma generation device 200 according to the second embodiment, only an electrode part of the first electrode member 222A and an electrode part of the second electrode member 222B may have sizes different from each other when viewed in the width direction of the separation sheet 20. Thus, the adhesive layers having different widths may be formed on the surface of the separation sheet 20 by the first electrode member 222A and the second electrode member 222B.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Supply device
200: Plasma generation device
210: Roller part
211: Transfer roller
212: Metal member
220: Plasma generator
221: Main body
221a: Support part
222: Electrode member
222a: Coupling part
222a-1: Support piece
222a-2: Coupling bolt
222a-3: Coupling nut
222b: Electrode part
222C: Connection part
223: Guide member
223a: Guide groove
223a-1: First groove
223a-2: Second groove
224: Display member
225: Fixing member

The invention claimed is:

1. A plasma generation device, which forms a patterned adhesive layer on a surface of a separation sheet, the plasma generation device comprising:

a roller part comprising a transfer roller configured to transfer the separation sheet and a metal member embedded in the transfer roller; and a plasma generator comprising:
a main body disposed to be spaced apart from the transfer roller and configured to be elongated in a width direction of the separation sheet that is perpendicular to a transfer direction of the separation sheet;
a plurality of electrode members disposed in the width direction of the separation sheet and configured to generate plasma on only a surface of the separation sheet, which is disposed at a position facing the metal member, to form the patterned adhesive layer on the surface of the separation sheet; and
a guide member configured to fix the plurality of electrode members to the main body,
wherein the guide member is detachably coupled to the main body to fix the plurality of electrode members to or to separate the plurality of electrode members from the main body at the same time and
wherein the guide member has an outer surface forming a guide groove to which the plurality of electrode members are slidably movably coupled in the width direction of the separation sheet.

2. The plasma generation device of claim 1, wherein each of the electrode members comprises:
a coupling part slidably coupled to the guide groove of the guide member;
an electrode part configured to generate the plasma on only a surface of the separation sheet disposed at the position facing the metal member; and
a connection part configured to connect the coupling part to the electrode part.

3. The plasma generation device of claim 2, wherein the connection part is detachably coupled to the coupling part.

4. The plasma generation device of claim 2, wherein the guide groove comprises:
a first groove in the outer surface of the guide member; and
a second groove inside the guide member and connected to the first groove, wherein the second groove has a diameter greater than that of the first groove, and
wherein the coupling part comprises:
a support piece w supported by the guide member and connected to the connection part;
a coupling bolt inserted up to the second groove via the first groove by passing through the support piece; and
a coupling nut inserted into the second groove and coupled to the coupling bolt.

5. The plasma generation device of claim 4, wherein the second groove is formed to pass in a lateral direction of the guide member, the lateral direction corresponding to the width direction of the separation sheet, so that the coupling nut is inserted.

6. The plasma generation device of claim 2, wherein the main body of the plasma generator further comprises a support part configured to support at least one of the electrode parts,
wherein the support part is formed to be elongated in the width direction of the separation sheet and is formed to have a curved surface corresponding to the transfer roller.

7. The plasma generation device of claim 4, further comprising a display member provided on a surface of the guide member and on which a scale is displayed in the width direction of the separation sheet, wherein the support piece is adjusted in position according to the scale of the display member.

8. The plasma generation device of claim 1, wherein the plurality of electrode members comprises:
   a first electrode member disposed on each of both ends of the main body in the width direction of the separation sheet; and
   a second electrode member provided between the first electrode members,
   wherein the first electrode member and the second electrode member have lengths different from each other when viewed in the width direction of the separation sheet.

9. The plasma generation device of claim 8, wherein the first electrode member has a length greater than that of the second electrode member.

10. The plasma generation device of claim 2, wherein the main body is made of a non-metal material, and
   wherein the electrode part is provided as a corona discharge electrode.

11. A facility for manufacturing an electrode assembly, the facility comprising:
   a plasma generation device according to claim 1;
   a supply device configured to supply the separation sheet whereby the patterned adhesive layer is formed on the surface of the separation sheet;
   a disposition device configured to dispose a radical unit on the surface of the separation sheet, on which the adhesive layer is formed, so that the separation sheet and the radical unit pattern-adhere to each other;
   a lamination device configured to press the separation sheet and the radical unit for bonding to each other; and
   a folding device configured to fold the separation sheet, on which the radical unit is disposed, to stack the radical unit vertically.

12. The plasma generation device of claim 2, further comprising at least one additional connection part configured to connect the coupling part to the electrode part.

13. The plasma generation device of claim 12, wherein each of the connection parts has a cross-section having a circular rod shape.

* * * * *